March 7, 1933. V. H. WINQUIST 1,900,475
SLEEVE VALVE TWO-CYCLE ENGINE
Filed Sept. 22, 1930 2 Sheets-Sheet 2
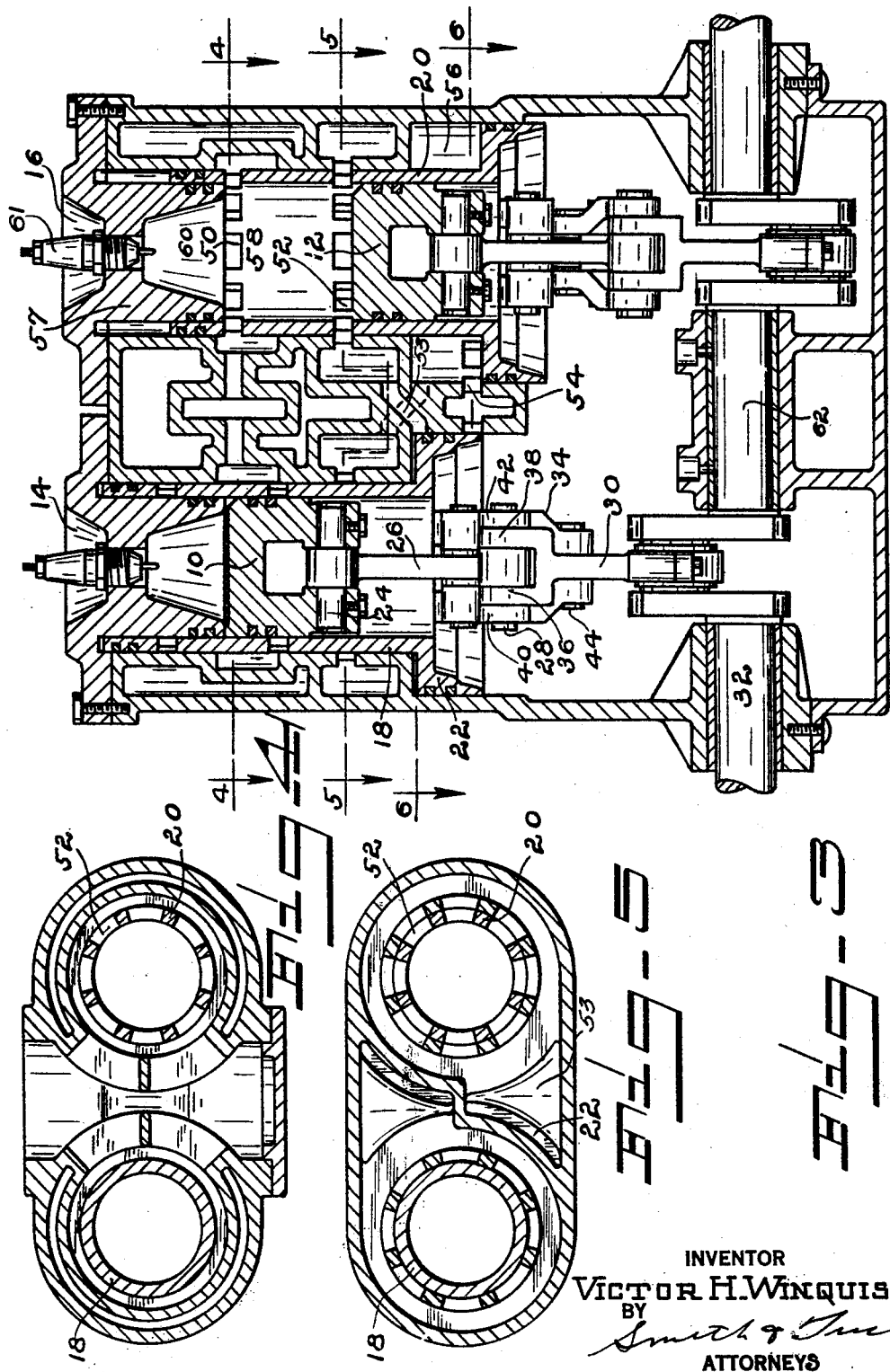
INVENTOR
Victor H. Winquist
BY
ATTORNEYS Patented Mar. 7, 1933

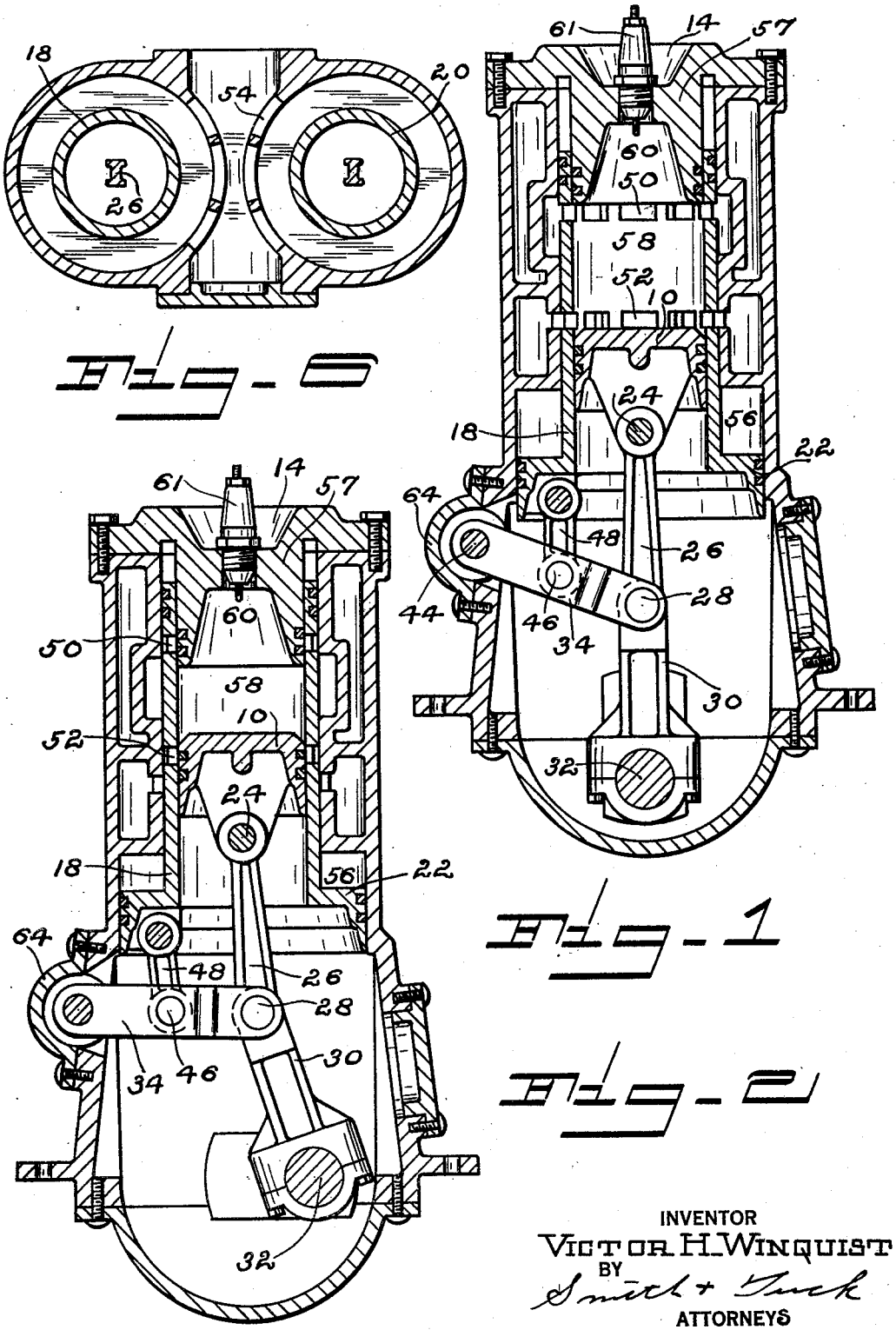

1,900,475

UNITED STATES PATENT OFFICE

VICTOR H. WINQUIST, OF SEATTLE, WASHINGTON

SLEEVE VALVE TWO CYCLE ENGINE

Application filed September 22, 1930. Serial No. 483,480.

My present application relates to two cycle internal combustion engines, and more particularly to a sleeve valve two cycle engine.

Many of the structural features of this present application are shown in my Patent No. 1,525,971, issued February 10, 1925.

The points of novelty of my present application over the patent, therefore, consist largely in the construction of my piston, my cylinder head and the method and means employed to operatively connect the piston and the sleeve piston with the crank shaft.

It has long been known to be quite a problem to maintain piston pin bearings and to prevent wear on pistons and cylinder walls, and in two cycle motors. To be thermally efficient every motor of this type must operate at comparatively high temperature, in fact are usually most efficient and provide the least thermal loss when operated at a temperature just below where the cooling water will be boiling.

Now in a four cycle engine the piston and cylinder walls are cooled to some extent once every cycle by the introduction of pure cold air in the case of a Diesel or similar engine, and in the gas engine, a full charge of cold, proper gas mixture, which provides a most successful cooling agent. In the two cycle engine, however, the introduction and firing of the gas in the cylinder causes an explosion on each revolution of the crank shaft and cooling under these conditions becomes quite a problem. This makes it very difficult to maintain lubrication on the cylinder walls and on the piston pin itself.

My present application, while in principle being similar to my former patent, is designed so that the cylinder walls are relieved almost entirely of any side pressure due to the angularity of the connecting rod, and the piston pin has practically no movement. A further advantage is found in the fact that the piston need only be long enough to provide sufficient space for enough piston rings to retain the gas pressure. Therefore:

The principal object of my invention is to provide means for operating a piston within a working cylinder wherein the side thrust, due to the angularity of the connecting rod, is transferred to a cylindrical bearing which is entirely away from the heat zone of the cylinder and which may be properly lubricated.

A further object is to provide means for moving my sleeve valve, which will not necessitate a separate connecting rod working on the engine crank shaft.

A further object is to provide a construction which will enable me to have bearings of suitable length between each working cylinder.

Other and more specific objects will be apparent from the following description taken in connection with the accompanying drawings, wherein:

Figure 1 is a cross-sectional view through my motor with the crank shaft shown at its lower limit of travel.

Figure 2 is a similar view but showing the crank shaft revolved 90° from Figure 1.

Figure 3 is a longitudinal sectional view through 2 of my cylinders.

Figure 4 is a cross-sectional view taken along the line 4—4 of Figure 3.

Figure 5 is a cross-sectional view taken along the line 5—5 of Figure 3.

Figure 6 is a cross-sectional view taken along the line 6—6 of Figure 3.

Referring to the drawings throughout which like reference characters indicate like parts, numerals 10 and 12 represent working pistons in the cylinders 14 and 16 respectively. Disposed about the pistons are the moveable cylinder walls or sleeves 18 and 20 respectively.

In explaining the operation of this engine, which operation is identical with that of my former application referred to, it is necessary to consider two cylinders at once, as one cylinder is provided with its fresh charge by its co-acting cylinder.

Secured to the lower end of, for instance, sleeve 18, is a pump cylinder piston 22, which may be provided with suitable piston rings. Rings in this portion are not an absolute necessity, however, as the pressures which the lower cylinders deal with seldom exceed a few pounds. Secured by any conventional manner in piston 10 is a piston pin 24. This provides the coupling means between piston 10 and the piston rod 26, which in turn at its lower end has a bearing which includes the cross head pin 28. The connecting rod proper 30 which encircles crank shaft 32 has a bearing on pin 28. Also secured by suitable bearings to pin 28 is the walking beam 34. This gives us three members all pivotably connected by the cross head pin 28. The exact manner of doing this is largely a matter of choice. In Figure 3 I have shown the piston rod 26 as having a single bearing with the connecting rod 30 having a yoke which provides two bearings 36 and 38, and member 34 I prefer to make as another yoked member having the two bearings 40 and 42. Beam 34 is pivoted upon the fixed pin 44. Approximately midway in the length of beam 34 another bearing pin is provided at 46. This forms the journal which connects link 48 to beam 34, which arm in turn is pivotably secured to the sleeve piston 18 and forms the operating means therefor. Sleeve 18 has disposed circularly therein the two rings of ports, the exhaust ports 50 and the transfer or cylinder intake ports 52. A third group of ports is provided at 54, as shown in Figure 3, for charging the lower cylinder chamber 56.

The cylinder heads 57 for the explosion chambers 58, as used for a gas engine, I prefer to provide with a coned combustion chamber 60 in the upper center of which is disposed the conventional spark plug 61, which in a Diesel or similar engine would be replaced by the fuel injection apparatus.

When viewed in Figure 3 it will be clear that with my new arrangement as distinguishing from the former patent, I now have room for a long bearing 62. This has been found to be a very desirable feature in multiple cylinder engines to prevent spring of crank shaft and bearing trouble.

When viewing my porting arrangement, it must at all times be borne in mind that the pump cylinder or cylinder 16 feeds the fresh charge by means of the transfer ports 52, to cylinder 14, and that when the crank shaft has progressed nearly one-half a revolution that the pump cylinder of cylinder 14 makes a similar transfer of the fresh charge to the combustion chamber of cylinder 16. In this way any engine built according to my principles must necessarily be built in multiples of two cylinders.

*Method of operation*

In the operation of my engine the first action on starting is for a fresh charge to be drawn into chamber 56 through the ports 54 from a source without the engine. In case of a Diesel, or similar engine, of course, it will be understood that pure air only would be so drawn in. In the case of a gas engine, however, a proper mixture of air and gasoline would be drawn in through a suitable carburetor. As the piston moves upwardly this gas mixture or air is compressed, usually not to exceed 5 or 6 pounds, and then transferred through the passageways indicated in Figure 5 and expelled out through ports 52 into the combustion chamber of the adjoining cylinder. Immediately after the transfer of the charge the sleeve valve 18 has moved upwardly so as to entirely close all ports.

After compression and spring a power stroke then takes place which drives the piston downwardly and in turn revolves the crank shaft 32. We now have within the cylinder a charge of burnt gas. As the crank pin moves downwardly it carries with it the beam 34, which in turn moves sleeve 18 downwardly, thus first opening the exhaust ports 50. This enables the largest portion of the exhaust to rush out while still at considerable pressure. This rapidly moving column of exhaust gas has a tendency, due much to its inertia, to continue going out and thus draw out the remainder of the burnt gas. Of course, it would be impossible to draw out all the gas were not additional air or gas supplied to take the place of the burnt gas. This is provided for, however, for as the power stroke continues the transfer or cylinder intake ports 52 are uncovered. This admits the gas or air compressed in the pump cylinder of the adjacent cylinder through the transfer ducts 53, and thus the burnt gases are driven out and replaced by a full cylinder of fresh air or gas mixture.

This one feature of the operation of my device, however, is not claimed in the present application and is merely repeated for the sake of clearness, as it was recited in my former application.

The feature that is believed to be novel in my present application is the means employed to give the proper motion to my piston and cylinder sleeve and pump piston.

When the explosion pressure comes upon piston 10 the piston starts downwardly with a heavy load which, in the conventional type of engine, may be resolved into two components, one a vertically disposed component provides the drive effort to the crank shaft and the other, a horizontal component, which will vary according to the angularity of the connecting rod, and which is energy wasted in that it merely drives against the cylinder wall. In the case particularly of a two cycle engine where lubrication is such a problem this side thrust causes unusual wear on piston and cylinder walls which means early, costly repairs. In my present construction, however, the pin 28 drives almost in a straight line, it being forced by bar 34 to travel along an arc using 44 as a center. In this way the angle of the piston rod 26 can never be but slight. It is true that the connecting rod 30 must take care of the angular displacement and the side thrust caused by its angularity is thrown against the bearing at 44. This bearing, however, is far removed from the heat zone, can be well lubricated and when it wears can be very easily replaced as it is only necessary to remove cap 64.

In the form illustrated it is maintained that the sleeve 18 will move approximately one-half, always in the same direction, as the piston travels. This amount is a function of the port arrangements and the location of bearing 46 with relation to points 28 and 44.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

What I claim is:

1. A two cycle, multiple cylinder, internal combustion engine consisting of compound cylinders each including a main cylinder and an auxiliary, larger cylinder; sleeves mounted in said main cylinders and having piston portions cooperating with said auxiliary cylinders to initially compress the charge; main cylinder pistons fitting within said sleeves; a multiple throw crankshaft; an oscillating piston rod for each main piston; a walking beam pivotably secured to said piston rod; an arm operatively connecting the walking beam to the sleeve; a connecting rod operatively connecting the walking beam and piston rod to the crankshaft; said sleeves and cylinders having cooperating ports to control the flow of gases; said engine having ports for leading the compressed charge from the larger cylinder of one pair to the smaller cylinder of the other pair.

2. A two cycle, multiple cylinder, internal combustion engine consisting of compound cylinders each including a main cylinder and an auxiliary larger cylinder; sleeves mounted in said main cylinders and having piston portions cooperating with said auxiliary cylinders to initially compress the charge; main cylinder pistons fitting within said sleeves; a multiple throw crankshaft; an oscillating piston rod, a connecting rod, a walking beam and a link connecting said walking beam and sleeve in each of said cylinder assemblies adapted to operatively connect said pistons and sleeves with said crankshaft; said sleeves and cylinders having cooperating ports to control the flow of gases; said engine having ports for leading the compressed charge from the larger cylinder of one pair to the smaller cylinder of the other pair.

3. A two cycle, multiple cylinder, internal combustion engine consisting of compound cylinders each including a main cylinder and an auxiliary larger cylinder; sleeves mounted in said main cylinders and having piston portions cooperating with said auxiliary cylinders to initially compress the charge, smaller pistons fitting within said sleeves; a multiple throw crankshaft; an oscillating piston rod, a connecting rod and a walking beam operatively connected at a common point; said walking beam being pivotably secured at one end to a fixed pivot in a manner to cause the common connecting point to move substantially in a vertical line; a link adapted to operatively connect the walking beam and the sleeve; said sleeves and cylinders having cooperating ports to control the flow of gases, said engine having ports for leading the compressed charge from the larger cylinder of one pair to the smaller cylinder of the other pair.

4. A two cycle, multiple cylinder, internal combustion engine consisting of compound cylinders each including a main cylinder and an auxiliary larger cylinder; sleeves mounted in said main cylinders and having piston portions cooperating with said auxiliary cylinders to initially compress the charge, smaller pistons fitting within said sleeves; a multiple throw crankshaft; oscillating piston rods, connecting rods and walking beams operatively connecting the smaller pistons to the crankshaft; said walking beams having a fixed pivot at one end and a link pivotably secured to the walking beam at a point between its fixed pivot and its point of engagement with the connecting rod; said link operatively connected to the sleeve and adapted to move the same in the same sense but to a lesser amount than the main cylinder pistons; said sleeves and cylinders having cooperating ports to control the flow of gases; said engine having ports for leading the compressed charge from the larger cylinder of one-pair to the smaller cylinder of the other pair.

5. In a reciprocating piston engine, the combination of a piston; a pump piston disposed co-axially with said piston; an oscillating piston rod pivotally secured thereto; a crankshaft; a connecting rod journaled upon said crankshaft; a walking beam having one end pivotally supported on a fixed pivot, a cross head pin pivotally securing in operative relationship the free end of the walking beam, the piston rod and the connecting rod and a link operatively connecting the pump piston and the walking beam.

In witness whereof, I have hereunto subscribed my name this 13th day of September A. D. 1930.

VICTOR H. WINQUIST.